June 28, 1927.

H. DALTON, SR

COMBINED TANK AND CARBURETOR

Filed Nov. 15, 1920

1,634,022

Inventor
Harry Dalton Sr.
By W. W. Williamson
Atty.

Patented June 28, 1927.

1,634,022

UNITED STATES PATENT OFFICE.

HARRY DALTON, SR., OF PHILADELPHIA, PENNSYLVANIA.

COMBINED TANK AND CARBURETOR.

Application filed November 15, 1920. Serial No. 424,325.

My invention relates to new and useful improvements in a combined tank and carburetor for internal combustion engines, and has for its object to provide for carbureting a volatile fluid contained within a suitable storage tank making it unnecessary to use separate storage tanks and carburetors.

A further object of the invention is to provide means for drawing air through or over a volatile fluid contained with a storage supply tank by means of the suction of the engine with which the supply tank is connected thereby producing a fuel supply in sufficient quantity for the engine without the likelihood of flooding the same.

A further object of the invention is to provide means for mixing air with the carbureted fuel and to provide means for regulating the flow of said air in order that it may be mixed in proper proportion to bring about the desired results.

A further object of the invention is to provide a carbureted fuel storage chamber within the supply line running from the supply tank to the engine so that a certain amount of carbureted fuel may be held in storage or reserve after the engine has been stopped in order that said engine may be readily restarted without having to draw the carbureted fuel the full length of the supply line from the supply tank for the initial pulsations of the motor or engine.

A further object of the invention is to provide for heating the air passing through the intake pipe to the supply tank.

A still further object of the invention is to provide for heating the contents of the supply tank and regulate this heating so as to properly assist the vaporizing of the particular liquid being used.

With these and other ends in view, this invention consists in the details of construction and combination of elements hereinafter set forth and then specifically designated by the claim.

In order that those skilled in the art to which this invention appertains, may understand how to make and use the same, I will describe its construction in detail, referring by numerals to the accompanying drawing forming a part of this application, in which:—

Figure 1:
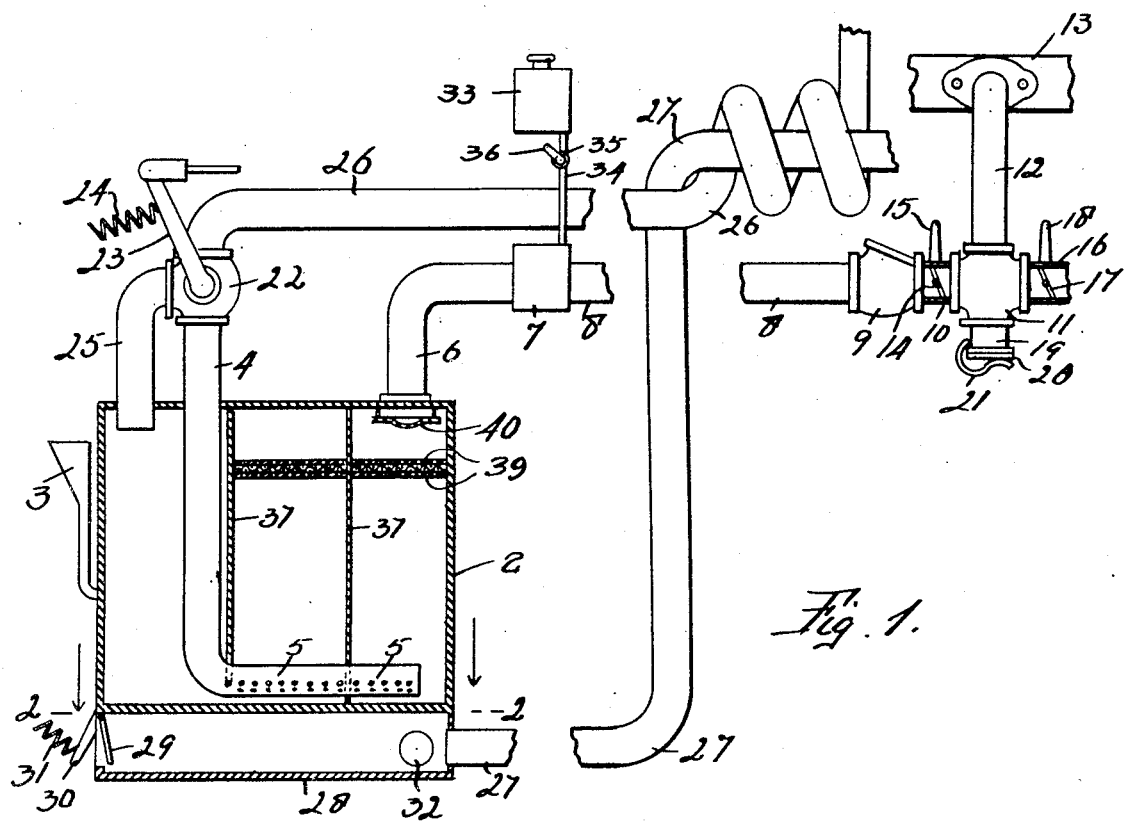
Fig. 1, is a sectional view of a supply tank showing the application of my invention and illustrating in elevation a supply line from said tank to the manifold, a portion of which latter is shown, the secondary air supply means connected with the intake manifold being shown partially in section.
Figure 2:
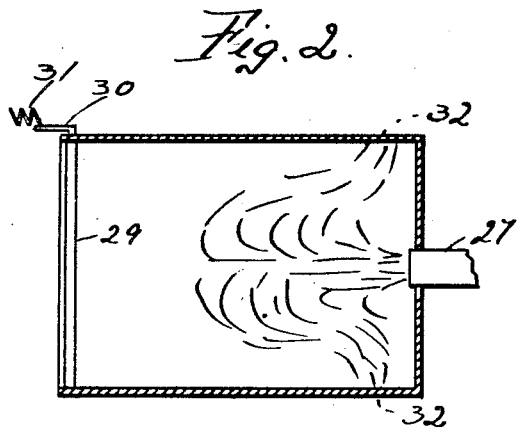
Fig. 2, is a section on the line 2—2 looking in the direction of the arrow.
Figure 3:
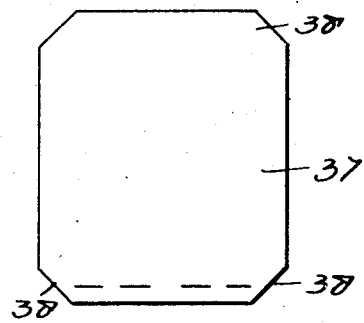
Fig. 3, is a detail elevation of one of the baffle plates.

In carrying out my invention as here embodied, 2 represents the volatile fluid supply tank which may be of any desirable shape and size as well as of any desirable capacity which may be filled with the volatile fluid such as gasolene or kerosene by means of the hopper 3 and into this tank leads an air supply pipe 4 the lower portion of which lies along the bottom of the tank and is provided with perforations 5.

From the top of the supply tank a pipe 6 leads to a temporary carbureted air storage compartment or chamber 7 and from the latter runs the pipe 8 in which is located the check valve 9, said check valve being connected by the short pipe 10 to the 4-way coupling 11. From the upper portion of this coupling a pipe 12 extends upward and is connected with a manifold 13 of an internal combustion engine in any suitable manner.

Within the short pipe 10 is mounted a butterfly valve 14 having a lever 15 so connected therewith as to provide for the proper manipulation of this valve.

Diametrically opposite the pipe 10 a short pipe 16 is connected with the 4-way coupling and has mounted therein a butterfly valve 17 provided with the operating lever 18; the outer end of said pipe 16 being open to the atmosphere.

19 represents a short pipe or nipple which is connected with the lower portion of the 4-way coupling and has an outwardly opening valve capper 20 pivoted thereto, said valve being normally held closed by the spring 29.

The upper end of the pipe 4 is connected with a 2-way valve 22 turning the operating lever 23 which is held in its normal position by the spring 24 and from this valve leads a branch inlet pipe 25 passing downward into the supply tank 2 its lower end terminating above the liquid level of said tank. The valve 22 is further utilized to control the amount of air passing into the supply tank 2 either through pipe 4 or pipe 25. Thus it will be apparent that the supply of air passing through these pipes is increased or diminished according to the amount of fuel in the tank, for instance, if the tank is full of liquid fuel, the amount of air permitted to pass through the pipe 25 is diminished so as to permit greater suction through pipe 4, whereas, when the amount of fuel in the tank is low, an increased amount of air is permitted to pass through pipe 25 and that passing through pipe 4 diminished.

26 represents the air inlet pipe one end of which is connected to the 2-way valve 22, a portion of said inlet pipe being coiled around the engine exhaust pipe 27 for the purpose of absorbing a certain amount of heat from said exhaust pipe; or this inlet pipe may be arranged in any other convenient way for absorbing the proper amount of heat from said exhaust.

The exhaust pipe 27 is led to a point below the supply tank 2, the outer end thereof entering the casing 28 secured beneath said supply tank so that the exhaust from the engine will be liberated beneath the tank within this casing. The rear end of this casing is provided with a hinged door 29 having attached thereto the operating lever 30, said door being normally held closed by the spring 31 connected with this operating lever. In the sides of the casing near the end thereof where the exhaust pipe enters are formed openings 32 for the escape of the exhaust gases when the door 29 is closed.

33 represents a priming tank from which the pipe 34 leads, said pipe being connected with the compartment 7 for the purpose hereinafter explained, and this pipe has a stop cock 35 located therein carrying an operating lever 36.

When my improvement is applied to an automobile the operating levers 15, 18, 23, 30 and 36 are preferably connected by suitable rods or wires to the instrument board of the machine in easy reach of the driver.

From the foregoing description the operation of my improvement will be obviously as follows:

By opening the valve 14 which serves as a throttle valve and starting the engine a partial vacuum will be created in the device leading from the supply tank to the manifold 13, thus drawing carbureted air from the tank to the engine and this air will be replaced in the tank by air flowing through the pipe 26, the valve 22 and either the pipe 4 or 25 and the richness of the fuel reaching the engine may be varied by the proper manipulation of the regulating valve 17; the check valve 9 serving to prevent any back flow through the pipe 8. The air entering the tank may be either directed through the pipe 4 thus compelling it to issue through the perforations 5 and percolate through the liquid fuel or this air may be directed to the tank through the pipe 25 being liberated above the liquid level by the proper setting of the valve 22; and it has been found in practice that when a high grade gasolene is used it is desirable to admit air to the tank through the pipe 25, but where a low grade gasolene or other less volatile fluid is used it is preferable to admit the air to the tank through the pipe 4.

After the engine has been started the exhaust flowing into the casing 28 will heat the bottom of the supply tank 2 sufficiently to materially assist in vaporizing the liquid contents of said tank and thereby facilitate the carbureting of the inflowing air. Should the exhaust entering the casing 28 tend to overheat the tank the door 29 may be partially or entirely opened permitting the exhaust to more freely escape, thus lessening its heating effect upon said tank.

Where a relatively low volatile fuel is used such as kerosene it is desirable to prime the apparatus with a high volatile fuel and this is accomplished by carrying a supply of gasolene in the priming tank 33 so that the proper manipulation of the valve 35 a certain quantity of this gasolene may be admitted to the reservoir compartment 7 so that during the starting of the engine the carbureted air from this gasolene will be utilized as fuel until the heat from the exhaust of the engine has raised the temperature of the low volatile fuel within the supply tank and the vapor therefrom has sufficiently enriched the inflowing air to cause the engine to continue to function. It may also be found desirable to permit the air to flow through the liquid within the supply tank by forcing it to pass down the pipe 4 when the gasolene within said tank is at a low level or when the engine and the parts connected therewith are cold. Suitable baffle plates 37 are located within the supply tank so as to prevent undue movement or sloshing of the liquid contained within said tank and the baffle plate next the air inlet pipe terminates at a short distance above the bottom of the tank so as to permit the air entering the forward end of this plate to pass beneath the lower edge thereof and when the liquid has fallen below the edge of said baffle plate, thus permitting the air to contact with the greater surface of the liquid in its travel to the outlet pipe 6. These baffle plates have their corners cut away as indicated at 38 to permit the liquid to flow from one compartment to the other.

I also provide horizontal baffle plates 39 which are perforated and may have interposed therebetween them a porous material to act as a filter, and to prevent the drawing of any liquid from the tank into the pipe 6, the deflector 40 is located beneath the end of the pipe 6 and spaced therefrom so as to permit the carbureted air to pass to the pipe 6 around the edges of said deflector. Should the engine back fire from any cause whatever the safety valve 20 will be immediately blown open giving free egress to the burning gases and preventing undue pressure upon the throttle valve and check valve eliminating the liability of the mixture back of the check valve becoming ignited.

By utilizing the heat from the exhaust as before described great efficiency in the use of the liquid fuel and the tendency of the supply tank sweating is overcome and the fuel is furnished to the engine under uniform conditions regardless of the temperature of the atmosphere.

When the engine is stopped the throttle valve 14 is closed so that the carbureted air contained within the storage compartment 7 will remain until the engine is again started at which time this carbureted air will be drawn into the engine for initially starting the same and as soon as started the engine will draw fuel from the supply tank as before stated.

While my improvement is especially adapted for automobile and flying machine engines it is also adapted for use in connection with all types of internal combustion engines using carbureted air and may be readily adapted thereto and therefore I do not wish to be limited to the exact details of construction as herein shown as these may be varied within the limits of the appended claim without departing from the spirit of my invention.

Having thus fully described my invention, what I claim as new and useful is:—

The combination with a fuel tank, partitions dividing the same into compartments, said compartments communicating at their lower corners beneath the fuel and at their upper corners above the fuel, of a heating compartment beneath the tank, warm air conduits entering the tank from the top of one of the compartments, with the lower portion of one of the conduits passing through the partitions at the bottoms thereof, said lower portion of this conduit having perforations within those compartments adjacent that through which the conduit enters, the other conduit extending above the fuel within the tank with its extremity terminating remote from the top of the tank, an exit pipe communicating with that compartment remote from that receiving the warm air conduits, and means connected to the exit pipe and warm air conduits for controlling the flow therethrough.

In testimony whereof, I have hereunto affixed my signature.

HARRY DALTON, Sr.